(12) United States Patent
Deakin et al.

(10) Patent No.: US 9,082,251 B2
(45) Date of Patent: Jul. 14, 2015

(54) SYSTEMS FOR PROVIDING AN INTERACTIVE NETWORKED PRODUCT CONTAINER

(75) Inventors: William J. Deakin, Smyrna, GA (US);
Jerome Daniel Phelan, Calgary (CA);
Robert James Curtin, Calgary (CA);
James Robert McMahon, Roswell, GA (US)

(73) Assignee: The Coca-Cola Company, Atlanta, GA (US)

( * ) Notice: Subject to any disclaimer, the term of this patent is extended or adjusted under 35 U.S.C. 154(b) by 858 days.

(21) Appl. No.: 12/505,196

(22) Filed: Jul. 17, 2009

(65) Prior Publication Data
US 2009/0281887 A1 Nov. 12, 2009

Related U.S. Application Data

(62) Division of application No. 10/755,492, filed on Jan. 12, 2004, now Pat. No. 7,593,867.

(51) Int. Cl.
*G06Q 30/00* (2012.01)
*G07F 17/16* (2006.01)
*G06Q 30/02* (2012.01)
(Continued)

(52) U.S. Cl.
CPC ............ *G07F 17/16* (2013.01); *G06Q 30/0222* (2013.01); *G06Q 30/0226* (2013.01); *G06Q 30/0238* (2013.01); *G06Q 30/0268* (2013.01); *G06Q 30/0277* (2013.01);
(Continued)

(58) Field of Classification Search
CPC ................................ G06Q 30/06; G06Q 30/08

USPC ............................................... 705/26.1, 27.1
See application file for complete search history.

(56) References Cited

U.S. PATENT DOCUMENTS 5,769,269 A   6/1998   Peters
5,822,216 A   10/1998  Satchell, Jr. et al.
(Continued)

FOREIGN PATENT DOCUMENTS

JP    2003151013 A    9/2003
WO    03098561 A1    11/2003

OTHER PUBLICATIONS

Burke, Raymond, Do you see what I see? The future of virtual shopping Academy of Marketing Science. Journal. Greenvale: Fall 1997. vol. 25, Iss. 4; p. 352, downloaded from ProQuestDIrect on the Internet on Mar. 23, 2011, 9 pages.*

(Continued)

*Primary Examiner* — James Zurita
(74) *Attorney, Agent, or Firm* — Sutherland Asbill & Brennan LLP (57) ABSTRACT

Networked product containers such as vending machines identify the presence of a potential customer via sensors, and present customized interactive marketing content to consumers. Consumers interact with a touch screen to win prizes, make purchases, or have a fun and interactive experience. The prizes and purchases offered by the product container may be determined by the product container or by one or more content servers in communication with the container. The content server may also provide digital content for display on the product container and remotely update the product container's content. The networked product container also includes a wireless access point to provide nearby wireless-enabled devices network connectivity via the product container.

16 Claims, 6 Drawing Sheets

(51) Int. Cl.
  *G06Q 30/06* (2012.01)
  *G06Q 40/04* (2012.01)
  *G07F 9/02* (2006.01)
  *G06Q 30/08* (2012.01)

(52) U.S. Cl.
  CPC ....... *G06Q 30/0601* (2013.01); *G06Q 30/0641* (2013.01); *G06Q 40/04* (2013.01); *G07F 9/02* (2013.01)

(56) References Cited

U.S. PATENT DOCUMENTS

| | | | |
|---|---|---|---|
| 6,308,887 B1* | 10/2001 | Korman et al. | 235/379 |
| 6,658,323 B2 | 12/2003 | Tedesco et al. | |
| 8,874,467 B2* | 10/2014 | Yahn et al. | 705/14.37 |
| 2002/0099608 A1 | 7/2002 | Pons et al. | |
| 2002/0198958 A1* | 12/2002 | Frenkiel et al. | 709/217 |
| 2003/0047602 A1* | 3/2003 | Iida et al. | 235/382 |
| 2003/0172028 A1 | 9/2003 | Abell et al. | |
| 2003/0177059 A1* | 9/2003 | Smorenburg et al. | 705/10 |
| 2004/0186768 A1* | 9/2004 | Wakim et al. | 705/14 |
| 2005/0060062 A1 | 3/2005 | Walker et al. | |
| 2005/0189364 A1 | 9/2005 | Herzog et al. | |

OTHER PUBLICATIONS

21st-century ticketing, Film Journal International, v 109, n 10, p. 30(8), Oct. 2006, downloaded from DialogWeb on the Internet on Mar. 24, 2011, 13 pages.*

* cited by examiner

SYSTEMS FOR PROVIDING AN INTERACTIVE NETWORKED PRODUCT CONTAINER

CROSS-REFERENCE TO RELATED APPLICATIONS

This application is a divisional of and claims the benefit to U.S. Nonprovisional application Ser. No. 10/755,492, entitled "Interactive Networked Product Container," filed Jan. 12, 2004, the entire contents of which are hereby expressly incorporated by this reference. The present application is also related to concurrently filed divisional applications, U.S. application Ser. No. 12/505,196, filed on Jul. 17, 2009, entitled "Methods for Providing an Interactive Networked Product Container," and U.S. application Ser. No. 12/505,187, filed on Jul. 17, 2009, entitled "Interactive Networked Product Container Kiosk."

FIELD OF THE INVENTION

The present invention relates generally to product containers, and more specifically, to product containers such as product containers that offer automated and interactive consumer experiences by providing marketing messages, prizes, network connectivity and purchasing interfaces.

BACKGROUND

Goods and services have been made available to consumers via product containers, such as product containers, fountain dispensers, automated teller machines (ATMs) and the like, for many years. Among other things, soft drinks, snacks, coffee, cigarettes, ready-prepared meals, banking transactions, and internet accessibility are illustrative goods and services sold via product containers. Due to their objective in providing consumers with goods and services in an uncomplicated and immediate manner, such transactions generally take very little time to occur. For instance, a soft drink vending transaction may occur in less than 10 seconds.

Because there may be little consumer effort and time involved in an automated transaction, it may be difficult to build brand awareness for products sold via product containers. For instance, in the case of a product container, there are no mechanisms to capture and hold a consumer's attention for any length of time other than fixed brand or product displays presented by a product container. This problem is further enhanced by the fact that conventional product containers generally provide no added benefits or features other than to provide consumers with ready access to products. Conventional product containers also have no mechanism for increasing their revenue. Historically, the only way to maximize profit from a product container is to sell marketable goods and to place it in a location likely to target successfully potential customers to maximize the number of transactions from a machine.

Because product containers like product containers and ATMs are widespread, with millions of installations around the world, it would be useful to enhance a consumer's experience in transacting with a consumer packaged goods product container while simultaneously offering an increased product container revenue source. What is therefore needed are systems, methods and apparatuses that create unique and interactive transaction experiences that are meaningful to consumers while simultaneously building brand and product awareness and maximizing product container profits.

SUMMARY OF THE INVENTION

Systems, methods and apparatuses of the present invention provide networked product containers, such as product containers, that include displays like touch-sensitive displays, for interacting with consumers. Each product container may be operable to identify the presence of a potential customer via one or more sensors, and to present interactive marketing content to consumers in the presence of the product container. Consumers may also interact with a product container's touch screen to win prizes, make purchases, or have a fun and interactive experience.

The prizes and purchases may include digital content awarded through the product container, such as digital media, or may include items redeemable at another source, such as through an Internet site. The prizes and interactive items may be made available for a limited time (e.g., a single time) after the purchase of a product from the product container, or after the insertion of money (e.g., cash, or credit or debit card information) into the machine. The prizes and purchases offered by the product container may be determined by the product container or by one or more content servers in communication with the product container. The content server(s) may also provide digital content for display on the product container so as to keep the product container's content updated by a remote source.

After making a product purchase, consumers may win prizes instantly. Consumers may select a prize based on their passions (e.g., music, sports, entertainment, travel, community, or the like). Consumers may also be given the opportunity to have an interactive and fun experience. For instance, consumers may receive a funny fortune, horoscope, or be able to select a song or video via a virtual juke box. According to one aspect of the invention, the product container is also operable to display event information corresponding to local events occurring (or yet to occur). This event information may include the time, date and location of an event, or interactive media such as video of a live event.

The networked product container may also function as a security device by using the one or more sensors in combination with a camera to monitor an area. The product container may also include a wireless access point to provide nearby, wireless-enabled devices network connectivity via the product container. As such, the product container may be connected via a high bandwidth connection to a network such as the Internet. Via wireless connectivity, such as through 802.11 connections or like connections known to those of skill in the art, consumers may then receive network connectivity, which may be free after a consumer purchase from the product container, or via a purchase of wireless access.

According to one embodiment of the present invention, there is disclosed a product container. The product container includes at least one product selector, where the at least one product selector is selectable by a consumer to identify a physically tangible product for purchase. The product container further includes a network interface, where the network interface facilitates communication of the product container with a network, and a wireless access point, where the product container is operable to dispense the product selected by the consumer, and to provide at least one device wireless communication with said network via the wireless access point.

According to one aspect of the invention, the network is the Internet. According to another aspect of the invention, the product includes consumer packaged goods, such as soft drinks. The product container may also be operable to communicate with a content server via the network interface, and to receive information from the consumer and upload the information received from the consumer to the content server. According to yet another aspect of the invention, the product container may further include output device operable to display content transmitted to the container from the content server. The output device may also be operable to print receipts, including receipts having a reward indicator printed thereon. According to one aspect of the invention, the container is a fountain machine or a vending machine. The product container may also include at least one sensor operable to identify the presence of a person near the product container. The at least one sensor may be a motion sensor, a microphone, a light sensor, and/or a radio-frequency sensor.

According to another embodiment of the invention, there is disclosed a kiosk including a network interface, where the network interface facilitates communication of the kiosk with a network. The kiosk also includes a wireless access point, to provide at least one device wireless communication with the network via the wireless access point. The kiosk is operable to download digital content to the at least one device.

According to one aspect of the invention, the network is the Internet. According to another aspect of the invention, the digital content comprises music. The kiosk may also be operable to receive information from a consumer associated with the at least one device, and to upload the information received from the consumer to the network. According to one aspect of the invention, the kiosk is a fountain machine or a product container. According to yet another aspect of the invention, the kiosk also includes at least one sensor, where the at least one sensor is operable to identify the presence of a person near the kiosk. The at least one sensor may be a motion sensor, a microphone, a light sensor, and/or a radio-frequency sensor.

According to yet another embodiment of the invention, there is disclosed a system for promoting products. The system includes a content server and at least one product container capable of communicating with the content server and operable to dispense tangible products. The at least one product container includes a display and an input device, where the input device is operable to receive at least one input from a consumer. The content server transmits content for presentation on the display.

According to one aspect of the invention, the content identifies at least one item, and the at least one item is selectable by the consumer via the input device. The at least one item may include a free item, where the free item is receivable by the consumer after purchasing a product from the at least one product container. The free item may be a horoscope, song, fortune, email, picture, postcard, game, and/or reward points. According to another aspect of the invention, the at least one item may include a purchasable item, where the purchasable item is receivable by the consumer after inserting value into the at least one product container. The purchasable item may be tickets, music, pictures, and/or digital content.

According to another aspect of the invention, the at least one product container may also include a printer operable to generate receipts comprising an item indicator. The at least one product container may also be operable to award the consumer with an instant prize upon the consumer making a purchase from the at least one product container. The instant prize may be selected by the content server. Further, the at least one product container may also include a printer operable to generate a receipt comprising a reward indicator, and the reward indicator may be entered at the web page to redeem the instant prize.

According to another aspect of the invention, the at least one product container may also include at least one database for storing content local to the at least one product container. The at least one product container may also be operable to display event information corresponding to an event geographically local to the at least one product container. Moreover, the at least one product container may comprise at least one sensor, where the at least one sensor is operable to identify the presence of a person near the at least one product container. The at least one sensor may be a motion sensor, a microphone, a light sensor, and/or a radio-frequency sensor.

According to another embodiment of the invention, there is disclosed a method of promoting products and selling items. The method includes the steps of repeatedly displaying advertising information at a product container until a consumer makes a purchase of a physically tangible product from the product container, and subsequent to the consumer making a purchase, offering, at a display of the product container, at least one item to the consumer, where the at least one item is different than the physically tangible product.

According to one aspect of the invention, the at least one item may include an instant prize or a purchasable item. According to another aspect of the invention, the method may also include the step of receiving input from the consumer to identify the at least one item. The method may further include the step of identifying the presence of a person located near the product container, and changing the advertising information displayed on the product container upon detection of the presence of a person located near the product container. According to yet another aspect of the invention, the method may include the step of displaying on the product container event information, where the event information corresponds to an event geographically local to the product container.

According to yet another embodiment of the present invention, there is disclosed a system for promoting products, including a content server and at least one product container operable to dispense a physically tangible product. The at least one product container is in communication with the content server and is operable to reward a consumer with goods or services subsequent to the consumer making a purchase from the at least one product container, where the goods or services are different from the physically tangible product.

According to one aspect of the invention, the goods or services are determined by the content server. The goods or services may also be selected from a group of goods or services stored on the at least one product container, and may be selectable by the consumer. According to one aspect of the invention, the goods or services may include a digital item rewarded to the consumer immediately upon selection by the consumer. According to yet another aspect of the invention, the product container may be a fountain machine, vending machine or cooler. The system may also include at least one sensor on the container, where the at least one sensor is operable to identify the presence of a person near the at least one product container. The at least one sensor may be a motion sensor, a microphone, a light sensor, and/or a radio-frequency sensor. The at least one product container may also be operable to download digital content to at least one device associated with the consumer, where the at least one device is a smart card, RF tag, handheld computer, wireless phone, personal digital assistant, or MP3 player.

According to another embodiment of the invention, there is disclosed a system for promoting products, including a content server and at least one product container operable to dispense a physically tangible product, where the at least one product container is in communication with the content server. In this embodiment the at least one product container is operable to reward a consumer with the physically tangible product subsequent to the consumer interacting with the at least one product container, where the consumer interaction does not include the selection of the physically tangible product.

According to one aspect of the invention, the goods or services are determined by the content server, and may be selected from a group of goods or services stored on the at least one product container. The goods or services may also be selectable by the consumer. According to another aspect of the invention, the goods or services include a digital item rewarded to the consumer immediately upon selection by the consumer. According to yet another aspect of the invention, the product container is a fountain machine, vending machine, or cooler. The container may also include at least one sensor operable to identify the presence of a person near the at least one product container, where the at least one sensor is a motion sensor, a microphone, a light sensor, and/or a radio-frequency sensor. The at least one product container may also be operable to download digital content to at least one device associated with the consumer, where the at least one device is a smart card, RF tag, handheld computer, wireless phone, personal digital assistant, or MP3 player.

According to yet another embodiment of the invention, there is disclosed an apparatus including a display screen for displaying marketing content to a consumer, and at least one sensor, where the at least one sensor is operable to identify the presence of a consumer located physically near the apparatus. The marketing content displayed by the apparatus is based at least in part on the presence or absence of a consumer located near the apparatus, as identified by the at least one sensor.

According to one aspect of the invention, the at least one sensor may be a motion sensor, a microphone, a light sensor, and/or a radio-frequency sensor. The apparatus may also include a network interface that facilitates communication of the apparatus with a network. The apparatus may also include a wireless access point that provides at least one device wireless communication with the network via the wireless access point. The network may be the Internet.

According to another aspect of the invention, the apparatus is operable to communicate with a content server via the network interface. The display screen may also display content transmitted to said apparatus from the content server. According to yet another aspect of the invention, the apparatus is a fountain machine, a vending machine or a cooler. Further, the apparatus may also include a security camera.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
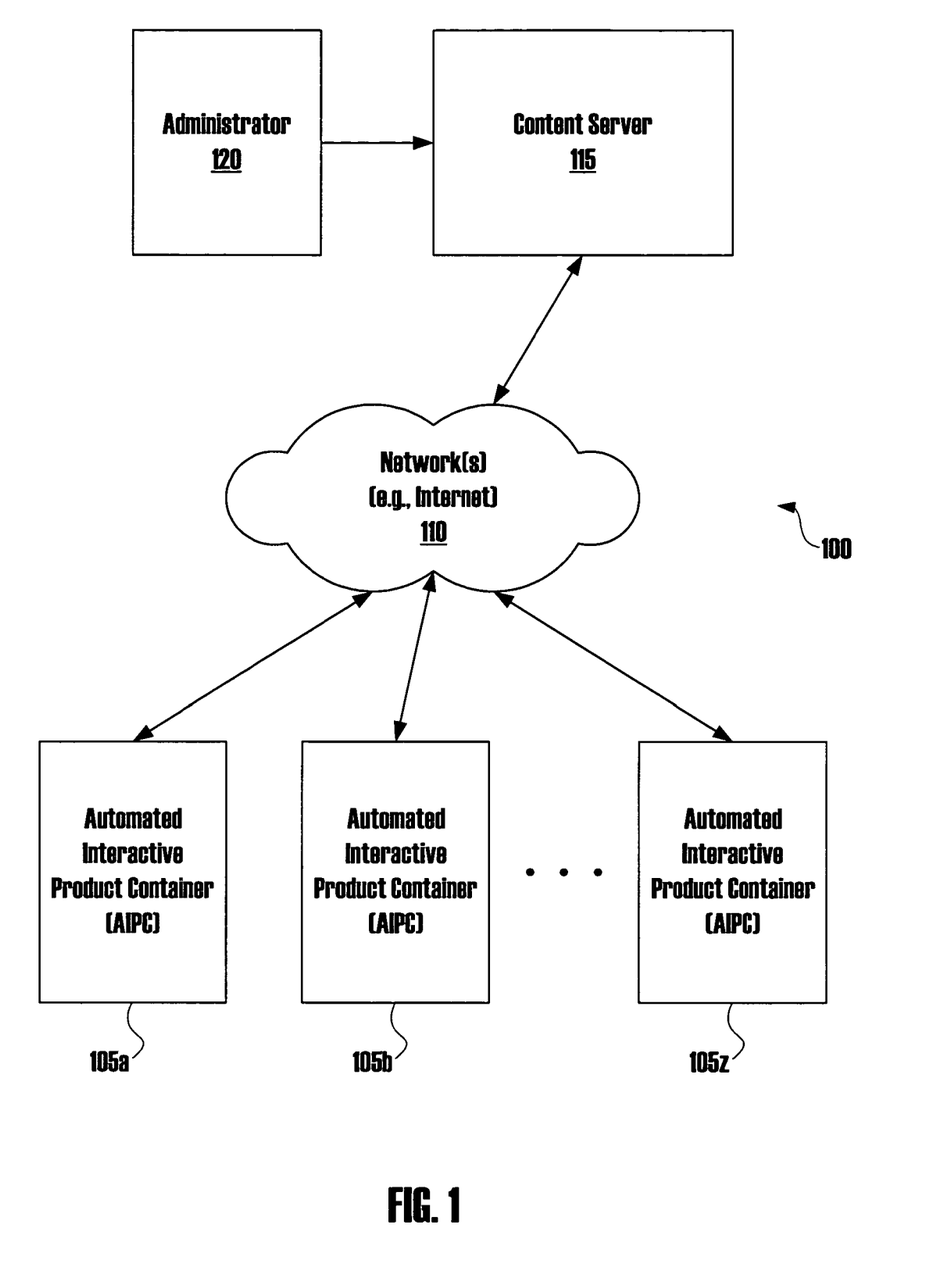
FIG. 1 shows a block diagram of an interactive transaction system, according to one embodiment of the present invention.

FIG. 1 shows a block diagram illustrating an exemplary interactive transaction system 100 in accordance with certain exemplary embodiments of the present invention. It will be appreciated that the systems and methods of the present invention are described below with reference to block diagrams and flowchart illustrations. It should be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a mechanism, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring again to FIG. 1, the interactive transaction system 100 is a system for providing automated and interactive product purchasing experiences, and includes one or more AIPCs 105a, 105b, . . . , 105z in communication via one or more networks 110 with a content server 115. It should be appreciated that the one or more networks 110 may include any telecommunication and/or data network, whether public or private, such as a local area network, a wide area network, an intranet, the Internet and/or any combination thereof and may be wired and/or wireless. Preferably, the content server 115 is in high speed communication with each AIPC via a broadband connection, such as an asymmetric digital subscriber line (ADSL), cable modem, or the like. According to one aspect of the invention, there may be two or more content servers (not illustrated) in communication with each, or one or more AIPCs.

According to a preferred embodiment of the invention, each networked AIPC may have an Internet Protocol (IP) address associated therewith, such that the content server 115 may identify and communicate with each AIPC individually and independent of the other AIPCs. In such an embodiment, the content server 115 may be an Internet server that is operable to provide content to the AIPCs 105s, 105b, . . . , 105z via the Internet. According to another embodiment of the present invention, the AIPCs may operate in a master-slave configuration, such that one or more of the AIPCs communicates with the one or more networks 110 and content server 115 via another AIPC. This communication may be fixed or wireless and may reduce the number high speed connections between the content server and a number of AIPCs. However, this may reduce the amount of content that may be transmitted to each AIPC through a particular communication link.

The content provided by the content server 115 to the AIPCs 105a, 105b, . . . , 105z may include digital media such as audio, video, text, web pages, and the like. Specific examples of digital media include advertising (or marketing) materials, music, videos, and the like. The digital media may be used by each AIPC for providing advertising and the interactive experiences described in detail herein. Each AIPC may receive updated advertising information from the content server 115 according to a predefined schedule, such as weekly or daily. According to another aspect of the invention, the content server 115 may remain in communication with the AIPCs such that digital media may be communicated to the AIPCs 105a, 105b, . . . , 105z at any time, including immediately after a purchase is made from an AIPC.

It will also be appreciated that content may also be provided to each AIPC 105s, 105b, . . . , 105z locally using an interface, such as a USB, serial port, wireless interface, or the like, on each AIPC. This may permit the direct downloading of a large amount of content to AIPCs. This may serve to limit the bandwidth required between the AIPCs and the content server 115, as the content server 115 may be configured to update the content downloaded locally to each AIPC.

The content provided by the content server to the AIPCs may be dictated by an administrator 120, which may include a system administrator, such as a person or group of persons, that provide content to the content server 115 for subsequent dissemination to the AIPCs. The administrator 120 may also dictate when the content server 115 should update the content of one or more of the AIPCs 105s, 105b, . . . , 105z. For example, an AIPC located nearby a business having a particular event may be updated, at the administrator's instruction, by the content server 115 to include advertising information marketing the business's event.

According to another illustrative example, digital content may be forwarded automatically to one or more AIPCs by the content server 115. For instance, the content server may wish to reward an instant prize to a consumer using one of the AIPCs, where the prize will be rewarded by the system 100 to the first consumer making a purchase from any one of the AIPCs 105s, 105b, . . . , 105z after a specific time on a particular day. Because the content server 115 is in communication with each AIPC, the content server 115 may identify when purchases are made from each AIPC, and transmit a reward message to a particular machine. These and additional examples will be described in further detail below.

Figure 2:
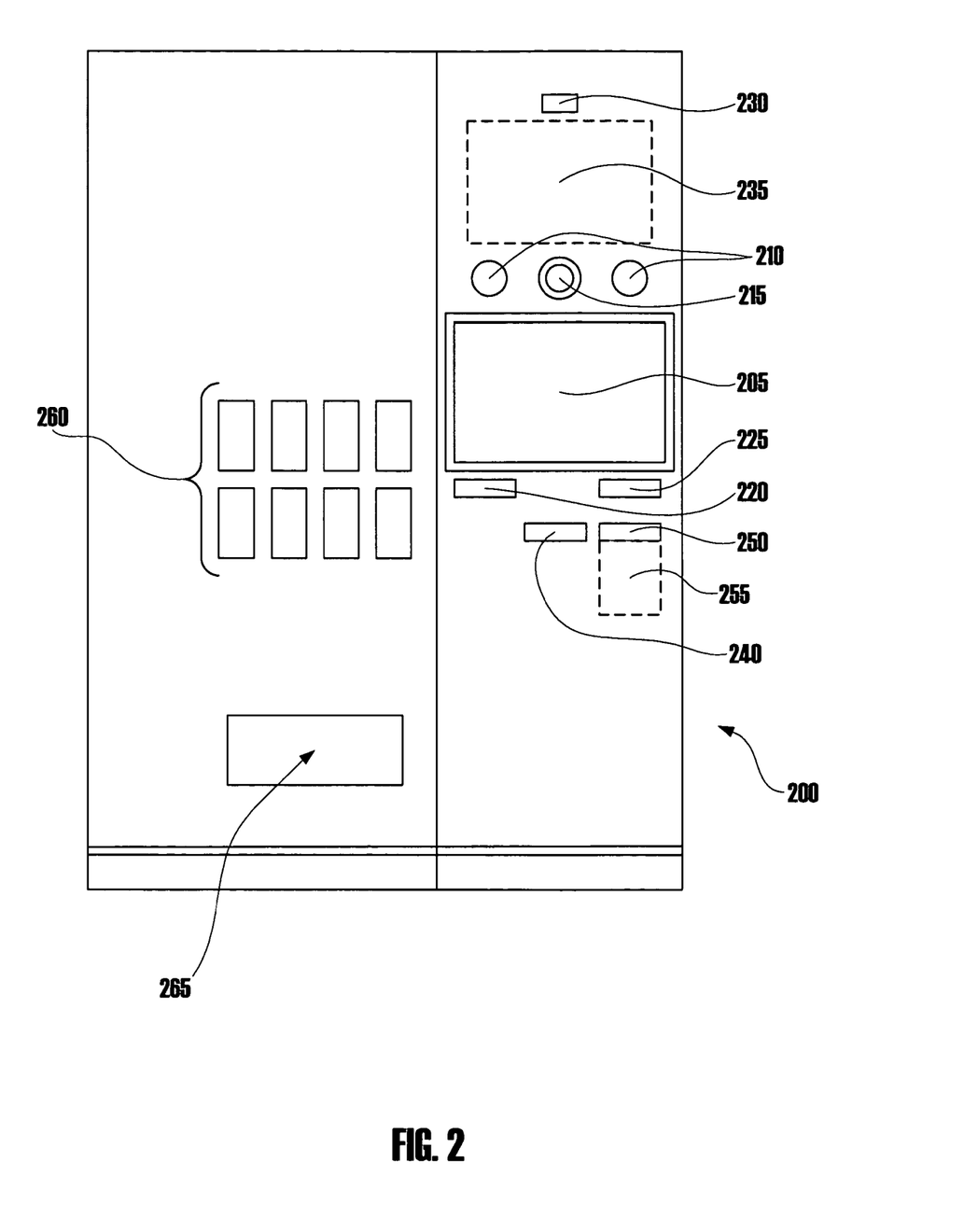
FIG. 2 shows a block diagram of an automated interactive product container (AIPC), according to one embodiment of the present invention.

FIG. 2 shows a block diagram of an AIPC 200, according to one embodiment of the present invention. As used herein, "AIPC" refers to any automatic sales machine that allows payment to be exchanged for goods and services, such as food products dispensed from snack or beverage machines, currency dispensed from automatic teller machines (ATMs), coins dispensed from pay telephones or slot machines, or the like. According to one embodiment of the invention, an AIPC according to the present invention is a product container, such as a product container, cooler, fountain machine, add-on kiosk, display mechanism, or the like. Add-on kiosks may be built to operate with a product container, cooler, fountain machine, display mechanism or similar device so as to provide conventional dispensing and/or display of goods and services as described in detail herein.

The AIPC 200 shown in FIG. 2 is a product container. The AIPC 200 is preferably designed to accommodate indoor and outdoor environments, high traffic locations having high usage, and to comply with safety and electrical rules and regulations. The AIPC is controlled by an AIPC module 235, displayed in FIG. 2 with dashed lines because it is preferably internal to the AIPC 200. The AIPC module 235, which is described in detail with respect to FIG. 3, controls the operation of the AIPC 200 and its communication with the content server 115. The AIPC module 235 controls functions of the AIPC 200 including, among others: audio and video display; touch screen interactivity; data capture; receipt/coupon/slip printing; video/audio capture; financial processing (credit/debt card and bill acceptance); bill validation and acceptance; WiFi capability; motion detection; and universal serial bus (USB)/firewire connectivity.

As shown in FIG. 2, the AIPC 200 includes at least one display 205, which may be a touch-sensitive display screen, such as an LCD or TFT display as are well known in the art. Therefore, the display 205 may also act as an input device for receiving input from a consumer interacting with the AIPC 200, including responding to questions, selecting items (e.g., instant prizes or free or purchasable items), and selecting one or more products for dispensing. The display 205 may also be used to receive input from an operator during stocking or maintenance of the AIPC 200. The AIPC 200 illustrated in FIG. 2 may also includes a product dispenser 265, which may dispense products identified for purchase by a consumer using the display 205 or one or more product selectors 260.

The AIPC 200 also includes one or more speakers 210 operable to play audio. The audio may include audible marketing content, and may play audio corresponding to digital content displayed on the display 205. The speakers 210 may also play music or other media selected by a consumer interacting with the AIPC 200. It is preferred that the speakers 210 be positioned at or near the front of the AIPC 200 to provide a purchaser or potential consumers with clear audio sound.

The AIPC 200 further includes at least one sensor 230 operable to identify the presence of a consumer located physically near the AIPC 200. According to one aspect of the invention, marketing content displayed on the display 205 is based in part on the presence or absence of a consumer near the AIPC 200. For instance, the AIPC 200 may operate in an idle mode, in which marketing material is displayed and cycled repeatedly. However, after the sensor 230 detects the presence of an individual, the AIPC 200 may enter an attract mode, in which the AIPC 200 invites consumers to interact with the AIPC 200 and previews activation benefits.

The at least one sensor 230 may include a motion, microphone, a light sensor, radio-frequency sensor, and/or other sensors known to those of skill in the art for identifying the presence of a person, sound, object or light near the AIPC

200. According to one embodiment of the invention, the at least one sensor 230 is capable of communicating with an active or passive RF tag or smart card near the AIPC 200. This permits the AIPC 200 to not only identify the general presence of a person, but to access content on the RF tag or smart card, such as the identity of a consumer. Additional material that may be received from a smart card or RF tag may include information such as a consumer's purchase history, which may be used to customized content shown on the display of the AIPC as the consumer approaches it.

The AIPC 200 may also include a digital camera 215 that may be used to take pictures and/or video. The pictures and/or video may be implemented into the marketing material displayed by the AIPC during the idle mode, or may be used in the attract mode. For instance, upon the motion detector 230 detecting the presence of a consumer, the digital camera 215 may take a picture that is incorporated into media content displayed on the display 205. Additionally, the digital camera 215 may also be used to take pictures upon selection by a consumer after a purchase or after a consumer may have inserted value into the AIPC 200. According to one aspect of the invention, a consumer having made a purchase or inserted value may receive a printed version of the photo or may download the photo from the AIPC 200 using the interfaces of the AIPC, as described below. According to yet another aspect of the invention, subsequent to a purchase or payment, a consumer may be presented with an email interface through which the consumer may email the digital picture.

The digital camera 215 may also operate as a security camera. Accordingly, the AIPC 200 may instruct the digital camera 215 to take video or pictures at select time periods, or upon the occurrence of an event, such as the purchase of a product. According to one embodiment of the invention, the AIPC module 235 instructs the digital camera 215 to take video or still pictures upon the occurrence of a security event identified by the at least one sensor 230. For instance, the digital camera 215 may take video or pictures while a person is located physically near the AIPC. According to one aspect of the invention, a combination of security events may be used to activate the operation of the digital camera 215. For instance, the digital camera 215 may be used to take photographs when a person is identified as in the presence of the AIPC after a particular time of day.

A number of AIPCs having digital cameras 215 may therefore be used as a security system to monitor the premises of an area in which the AIPCs are placed. In such a scenario, the AIPCs may also be connected to form a LAN. This may be implemented using a master-slave concept, as described above, or by connecting each AIPC to a local network managed by a content server. According to one aspect of the invention, the networked AIPCs may be controlled by a security interface such that video or still images from each of the AIPCs may be monitored remotely from a single location. Using the interface, a user may also identify or define the security events that trigger the performance of the security camera (i.e., the capture of video or images). The interface may be accessible by the administrator, locally, or by a third party communicating with each AIPC 200, or the content server, via the one or more networks 110.

The AIPC 200 may also include several mechanisms for receiving payment and dispensing change, including a card reader 225 and a coin and bill acceptor/validator 240. The coin and bill acceptor/validator 240 receive and validate currency that is stored by a currency storage apparatus in the AIPC 200. It will be appreciated that the coin and bill acceptor/validator 240 may include separate devices. The card reader 225 may be embodied as a conventional reader for reading data from a credit, debit or chip-based "smart" card or other stored value card, and it may cooperate with conventional remote point-of-sale credit card processing equipment (not shown) to validate card-based purchases through a conventional card authorization network. Customer information obtained by the card reader 225 may be used in conjunction with a customer database (not shown), for example, to select an appropriate marketing promotion based on a customer's purchase history. The card reader 225 and coin and bill acceptor/validator 240 interface with the AIPC module 235, which may monitor the amount of money received by the AIPC 200. This information may be provided to the content server 115 or administrator 120 to monitor the AIPC 200.

The AIPC 200 also includes a printer 250 operable to print receipts using paper from a printer roll 260 inside the AIPC 200. The printer is operable to print receipts including a reward or item indicator. According to one embodiment of the present invention, a consumer may receive an instant prize, or purchase items, that are not deliverable via the display 205 and speakers 210 of the AIPC 200. When this occurs, the AIPC 200 is operable to print a receipt that includes a reward or item indicator, which may include a number the consumer must input into a web site to redeem the reward or purchased items. For instance, after using the AIPC 200 the consumer may be told on the display 205 that he or she won free tickets to a concert that cannot be printed using the AIPC 200. In this illustrative example, the consumer may receive a receipt including a reward indicator stating "You Have Won 2 Free Tickets! To Redeem You Prize, go to CokePrize.com and Enter the Number Provided Below:," where the receipt includes a number or code associated with the two free tickets. The printer 250 may also include a color photo printer or like device to print photographs or other color content. The function of the AIPC 200 will be described in greater detail with reference to FIG. 3, below.

Figure 3:
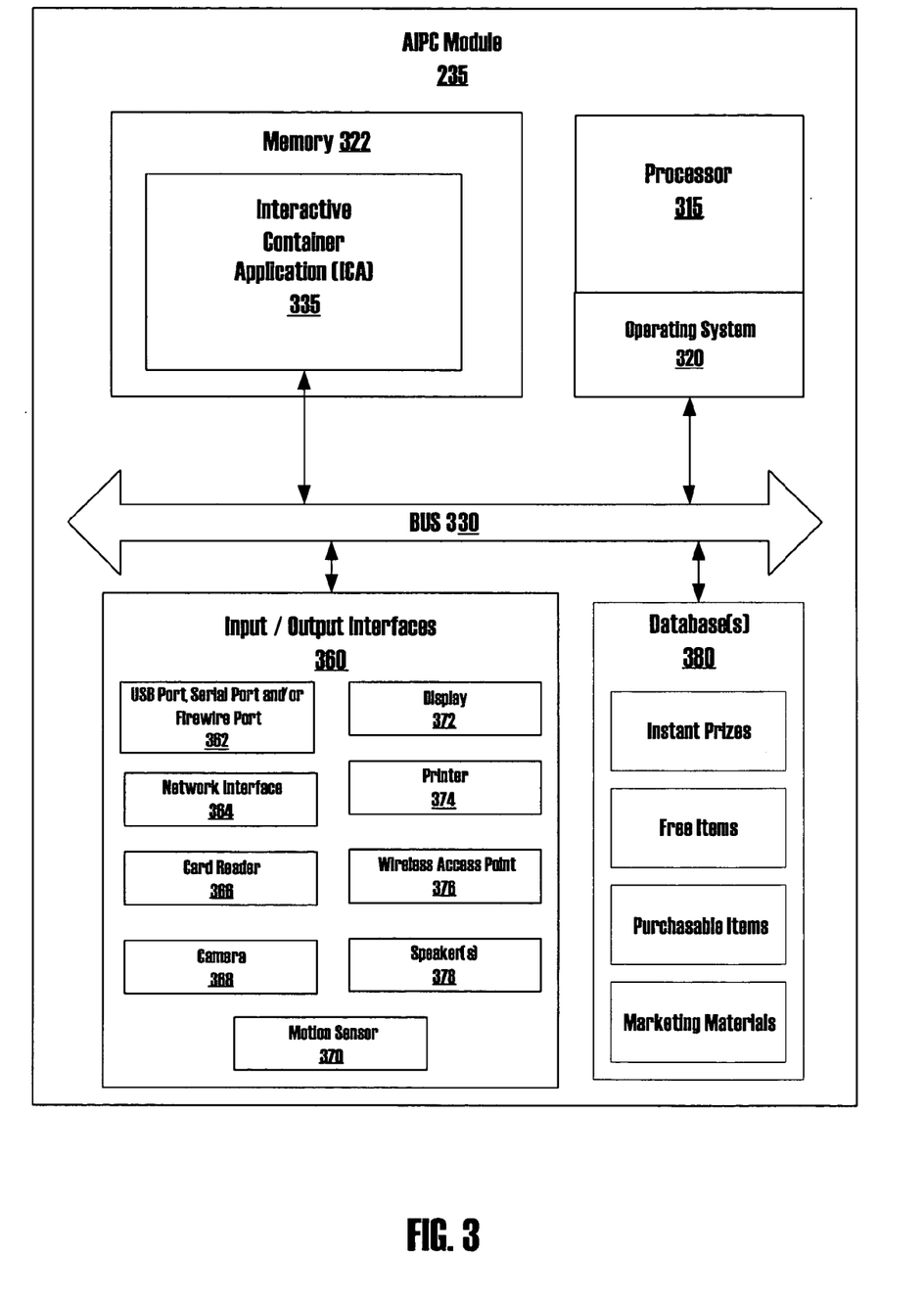
FIG. 3 shows an automated interactive product container module for operating an AIPC, according to one embodiment of the present invention.
Figure 4:
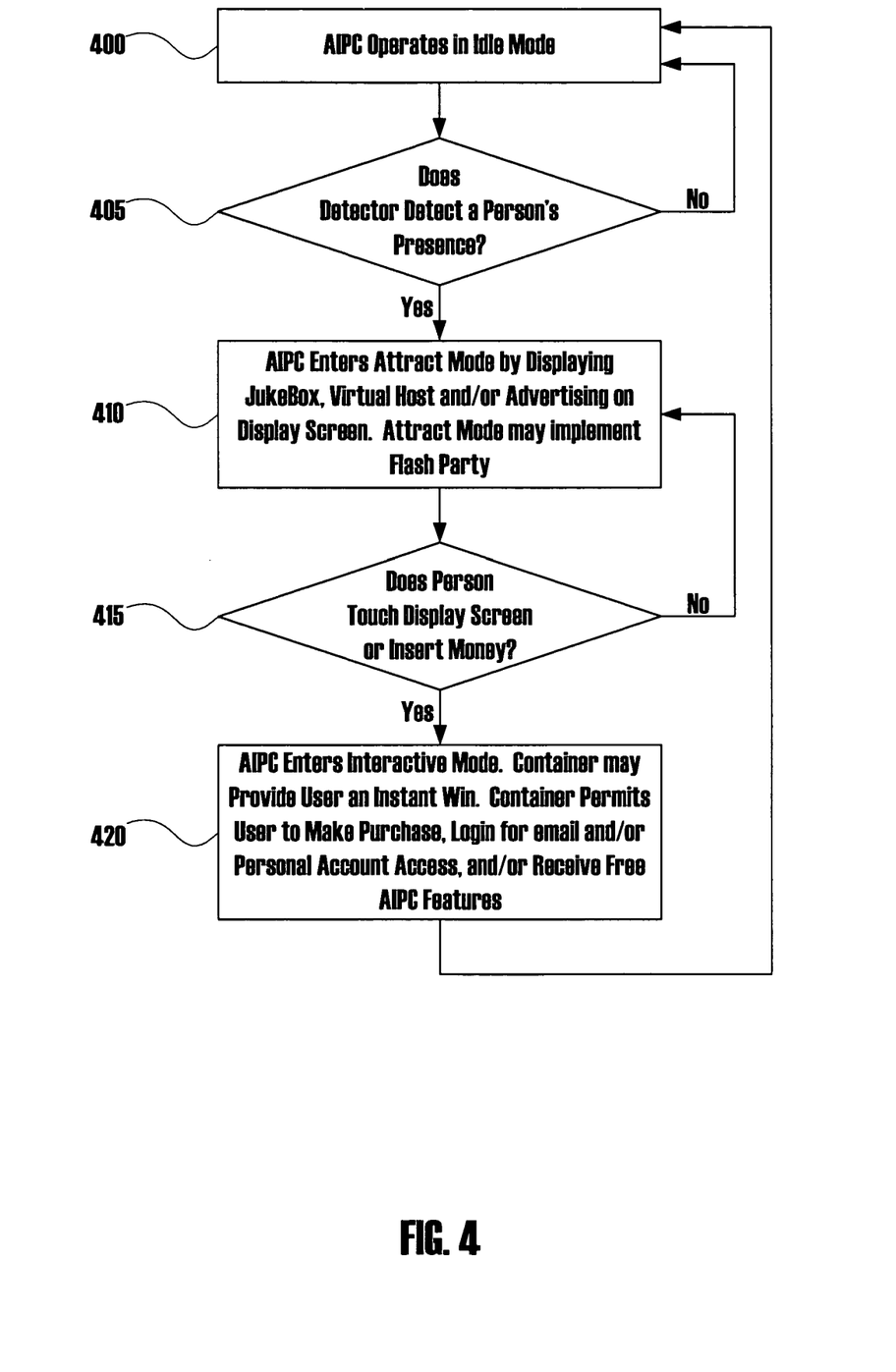
FIG. 4 is a block diagram flow chart illustrating the operation of an AIPC, according to one embodiment of the present invention.

Next, FIG. 3 shows an AIPC module 235 for operating an AIPC 200, according to one embodiment of the present invention. As illustrated in FIG. 4, the AIPC module 235 may include a processor 315 that operates in conjunction with an operating system 320 to implement the AIPC functions described herein. According to one embodiment of the invention, the AIPC module 235 implements instructions dictated by an interactive vending application (ICA) stored in a memory 322 of the AIPC module 235. The processor 315, operating system 320 and memory 322 are in communication via the bus 330, as are each of the components within the AIPC module 235, as is well known in the art. Although illustrated herein as a single application, the ICA 335 may include numerous software applications or modules for implementing the functions of the AIPCs described herein. As was noted above, although described in terms of a software application, the functions implemented by the ICA 335 for facilitating the operation of an AIPC of the present invention may also be embodied in one or more hardware components that are not illustrated herein.

The AIPC module 235 also includes input/output (I/O) interfaces 360 and one or more databases 380. The I/O interfaces 360 facilitate communication between the processor 315 and various I/O devices, and include: a USB port, serial port and firewire port 362; network interface 364, card reader 366; camera 368; sensor 370; display (e.g., touch-screen display including input capability) 372; printer 374; wireless access point 376, and speaker(s) 378. Each of these interfaces may take any of a number of forms, such as a network interface card, a modem, etc. The card reader 366, camera 368, sensor 370, display 372, printer 374, and speaker(s) 378 interfaces permit the AIPC module 235 to communicate with the hardware devices of the AIPC, as described above. The remaining interfaces permit the AIPC 235 to communicate with other computers and devices external to the AIPC. It will be appreciated that one or more additional interfaces, as are known in the art, may also be included in the AIPC to effect the functions described herein.

For instance, the network interface 364 may include an ADSL modem that permits the AIPC to communicate at high data rates with the content server 115. Using the network interface 364, the AIPC may also communicate with a wide area network (WAN), such as a university network. The USB port, serial port and firewire port 362 enables the AIPC to communicate with consumer and technician devices to download items and diagnostic information. The wireless access point 376, as described in detail below with respect to FIGS. 5 and 6, enable AIPCs of the present invention to provide a wireless local area network to wirelessly enabled devices such as mobile phones, laptops, handheld computers, and the like.

The database(s) 380 are operable to store locally content received from the content server 115, including instant prizes, free items, purchasable items, and marketing material. The databases may be any database known to those of skill in the art, such as sequential query logic (SQL) databases. According to one aspect of the invention, digital content may be forwarded automatically to one or more AIPCs by the content server as the content is required for display by an AIPC. In this scenario the content may be streaming such that the database(s) 380 need not store content prior to it being displayed on an AIPC. This may occur, for instance, where the content server 115 rewards an instant prize to the first consumer making a purchase from an AIPC at a specific time on a particular day. On the other hand, according to another aspect of the invention, content, including instant prizes, may be transmitted from the content server 115 and stored in the database(s) 380. This is advantageous because the AIPC need not be in constant communication with the content server 115 to interact with a consumer.

In FIG. 3 the database(s) 380 for storing the content forwarded to the AIPC from the content server 115 are illustrated as internal to the AIPC module 235. However, it will be appreciated that the database(s) 380 may be located external to or remote from the AIPC module 235 (such as on a third party Internet server) or integrated within the memory 322. Furthermore, those skilled in the art will appreciate that a single database or additional physical and/or logical databases may be used to store the above-mentioned content.

Next, the function of an AIPC of the present invention will be described with respect to FIG. 4, which is a block diagram flow chart illustrating the operation of an AIPC according to one embodiment of the present invention. Before a consumer approaches an AIPC, the AIPC operates in an idle mode (block 400), in which marketing material is displayed and cycled repeatedly. The marketing material may contain brand-related graphics or video content. The idle mode may also cycle screensaver applications in addition to or instead of cycling the marketing material. The content displayed in the idle mode is dictated by the ICA 335 of the AIPC module 235, and may play display content stored within one or more database(s) 380, such as a idle mode database, in the AIPC module 235.

After the sensor 230 detects the presence of an individual (block 405), the ICA 335 operates to place the AIPC into an attract mode (block 410), in which the AIPC invites consumers to interact with the AIPC and previews activation benefits. According to one aspect of the invention, the attract mode (block 410) may include a sequence of media content introduced by a virtual host displayed on the display 205. According to one aspect of the invention, the virtual host may be randomly selected from a number of virtual hosts. A virtual host may include a video and/or picture of a person, graphics representing a host, such as a rendering of a cartoon-like character or the like, graphics combined with audio, or graphics.

Like the idle mode, the content displayed in the attract mode is determined by the ICA, which may query one or more database(s) 380 to display the attract mode media content. In the attract mode the virtual host may introduce the content available on the AIPC 200 via one or more media segment screens (including associated video and audio) in an attempt to entertain and/or persuade the consumer to make a purchase from the AIPC 200. For instance, the attract mode may display the instant prizes that may be available if a purchase is made, or the free items that a consumer may choose from after making a purchase. According to one aspect of the invention, the attract mode may also display a "flash event", which is event information corresponding to local events occurring (or yet to occur). This event information may include the time, date and location of an event, or interactive media such as video of a live event.

If the consumer interacts with the AIPC by touching the display or by purchasing a product (block 415), the ICA 335 will cause the virtual host and/or one or more media segment screens to be interrupted, and will cause the AIPC to enter an interactive mode in which an options menu is displayed to the consumer (block 420). If the consumer touches the AIPC without making a purchase, the consumer is provided with one or more menus and submenus (arranged in a tree-like directory fashion) in which items may be purchased from the AIPC.

Purchasable items may include tickets, music, pictures, and digital content. For instance, a consumer may choose to buy music from the AIPC, where the music is played through the AIPC speaker(s) or downloadable to a digital device (e.g., laptop, personal digital assistant, mobile phone, or the like) of the consumer wirelessly via the wireless access point 376 or via the USB port, serial port and/or firewire port 362. According to one aspect of the invention, purchasable items may be any items accessible via the content server 115, such that the purchasable items are not limited by items stored local to the AIPC. For instance, goods and services from a third party provider may be made available for purchase from the AIPC. This purchase may occur through customized pages, or via an Internet or like interface provided by the AIPC. To effect the purchase of purchasable items, the consumer must enter value into the AIPC via the card reader 225 and/or a coin and bill acceptor/validator 240. As described above, where the purchased item is not immediately deliverable to the consumer, a receipt may be printed that includes an item indicator.

On the other hand, if the consumer has purchased a product, the AIPC may offer the consumer an instant prize, which may be selected from the one or more database(s) 380 within the AIPC module 235, or transmitted from the content server 115 to the AIPC immediately after the consumer's purchase. According to one aspect of the invention, the instant prize may include any of the purchasable or free items (i.e., goods or service) disclosed herein. An instant prize may not be awarded, and instead the AIPC may offer the consumer a free product or service, such as a horoscope, song, video, fortune, email, picture, postcard, game, reward points, or additional product from the AIPC. Whether or not an instant prize is awarded may be determined by the ICA 335 or by the content server 115, as described above.

According to one embodiment of the invention, the AIPC may communicate with a consumer's card, such as a smart card, inserted into the card reader 225 such that consumer information on the consumer's card may be accessed or updated. The AIPC may also access and update consumer information wirelessly, such as consumer information stored on a smart card, RF Tag, or wireless device associated with a consumer located near the AIPC. This consumer information may also be transmitted to the content server 115 for storage.

According to one illustrative example, a consumer's card may include one or more databases having consumer purchase history or preferences stored thereon. Accordingly, after a product is purchased from the AIPC, the consumer's card may be updated to identify that the product the consumer purchased. Media, prizes and/or products sold via the display may be customized based on the consumer's purchase history or preferences. For example, if a consumer may have purchased the same soft drink in each of the last 10 transactions, upon inserting their card the consumer may be encouraged by the AIPC to try a different product.

According to another illustrative example of the present invention, prize, redemption points, money, or value may be added to a consumer's card, such that the card may be used to purchase products from the AIPC. These may be added as a prize or a reward for purchasing a product from the AIPC. Where the card is a smart card, the card may be used by the consumer at a computer having a card reader to access particular Internet web pages or content. The AIPC may also query a consumer via the display, where the consumer's answers may be used to update preferences stored on the consumer's card or on the content server 115.

Figure 5:
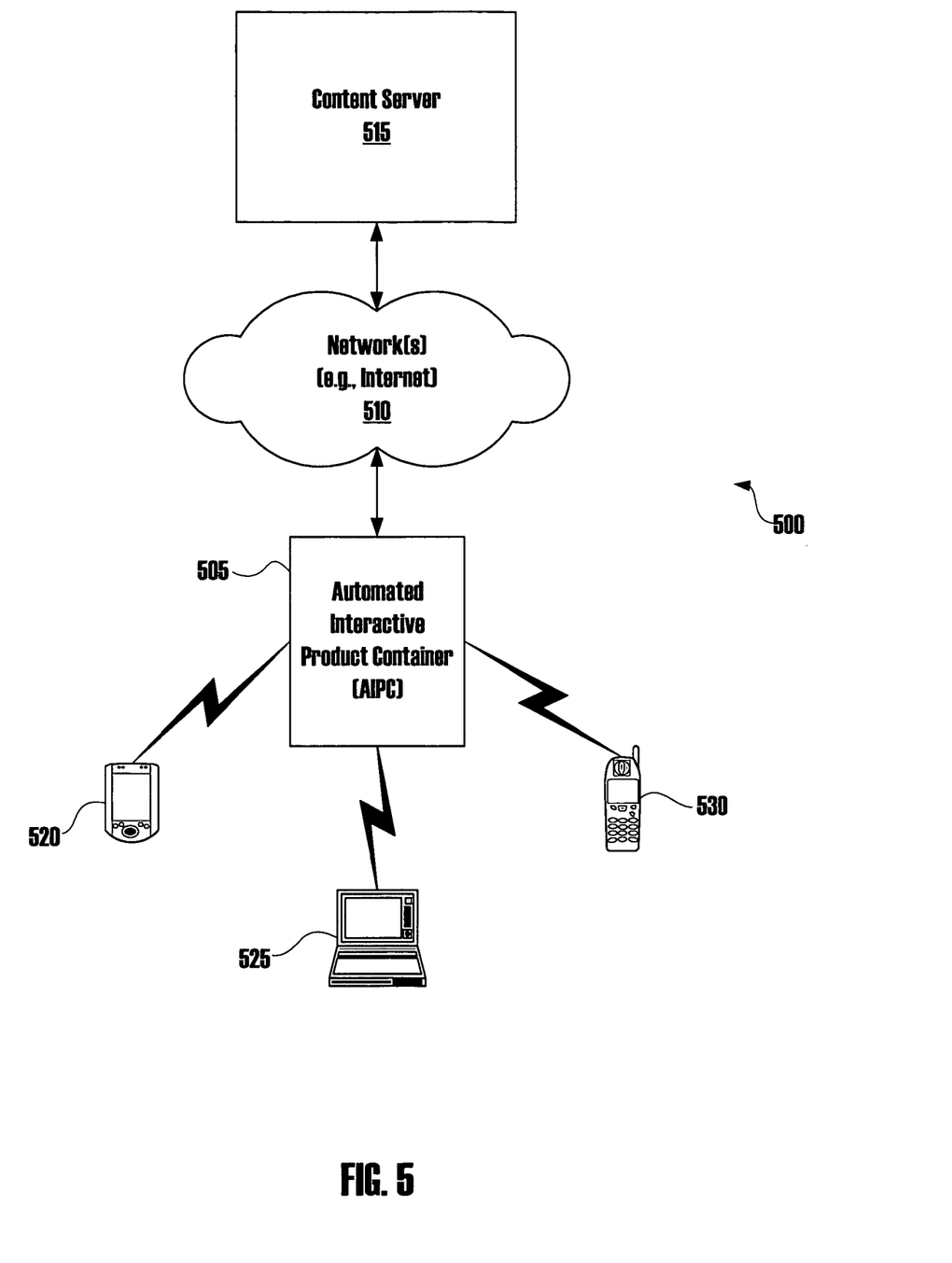
FIG. 5 shows a block diagram of an interactive transaction system including a wireless access point, according to another embodiment of the present invention.

Next, FIG. 5 shows a block diagram of an interactive transaction system 500 including a wireless access point, according to another embodiment of the present invention. As illustrated in FIG. 5, a content server 515 is in communication with an AIPC 505 via one or more networks 510, in the same manner as described above with respect to FIG. 1. However, in the embodiment shown in FIG. 5, the AIPC 505 includes a wireless access point, such that the AIPC is operable to provide wireless devices, such as handheld computers 520, laptops 525, and mobile phones 530, access to the one or more networks 510. The wireless devices 520, 525, 530 may communicate with the AIPC via any wireless communication standard or method known in the art, such as IEEE standard 802.11, Bluetooth, or any like communication medium known to those of ordinary skill in the art.

Figure 6:
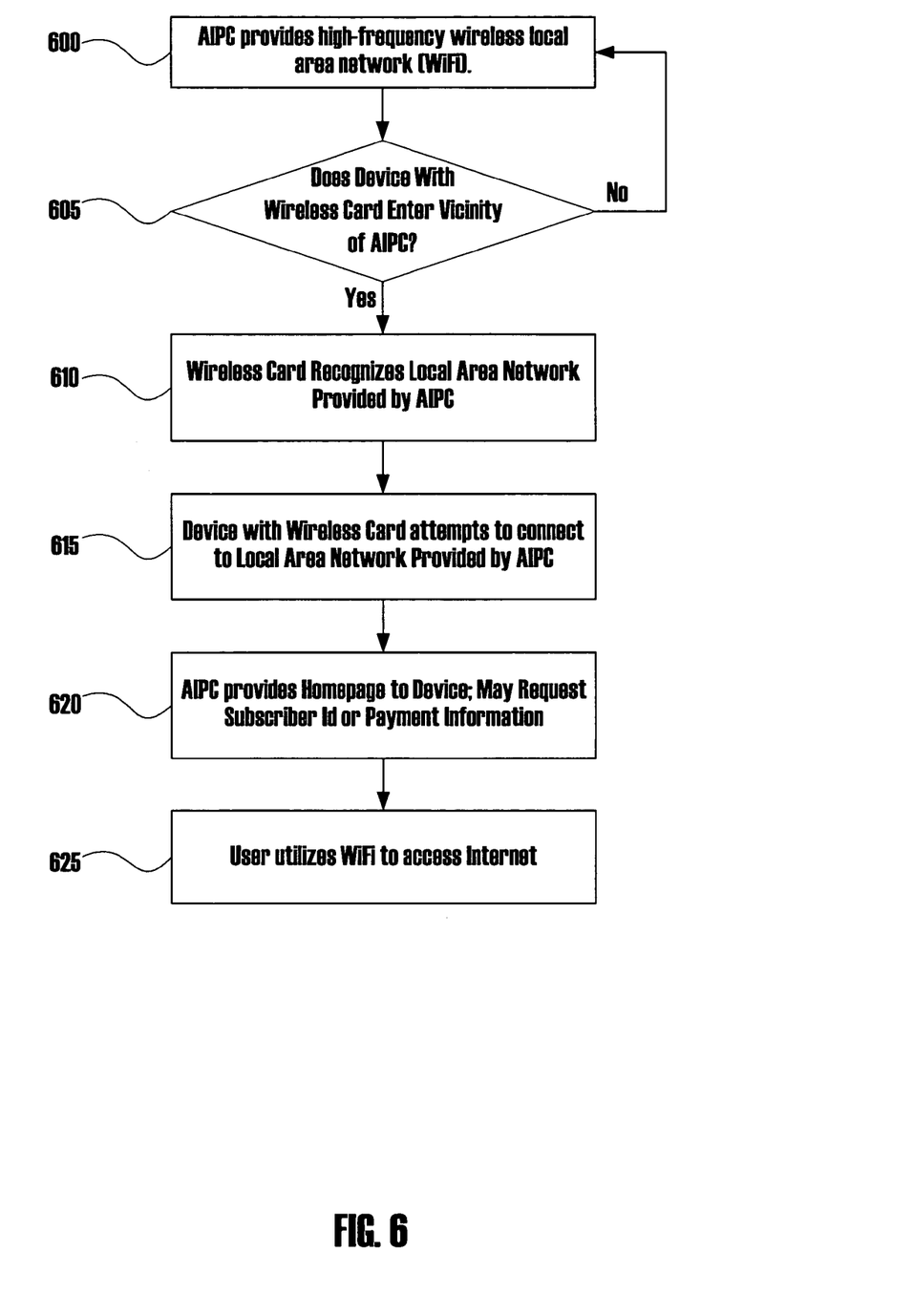
FIG. 6 is a block diagram flow chart illustrating the operation of the interactive transaction system of FIG. 6, according to one embodiment of the present invention.

FIG. 6 is a block diagram flow chart illustrating the operation of the interactive transaction system of FIG. 5, according to one embodiment of the present invention. As illustrated in FIG. 6, using the system 500 described in FIG. 5, the AIPC provides consumers with a high-frequency wireless local area network (block 600). If a device having a wireless card enters the vicinity of the AIPC (block 605), the wireless card in the device recognizes the local area network created by the AIPC (block 610) and attempts to connect to the AIPC local network (block 615). Thereafter, the AIPC may request a consumer's account number to validate the consumer as a subscriber to the wireless service, or may request payment information (block 620). According to one aspect of the present invention, a subscriber account may be established by the consumer at the AIPC. After obtaining wireless access to the AIPC local network, the consumer may utilize the wireless access to access the one or more networks 510, such as the Internet.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the present invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A system for promoting products to a consumer, comprising:
   at least one content server comprising content stored on a computer-readable medium; and
   at least one product container capable of communicating with the at least one content server and operable to dispense tangible products, said at least one product container comprising:
   at least one sensor operable to detect a consumer's identity and presence in proximity to the product container;
   a processor configured to determine customized content selected from the content stored at the at least one content server to present to the consumer based at least in part on the consumer's identity and presence in proximity to the product container;
   a display operable to present the customized content on the display prior to a user's input to the product container;
   an input device operable to receive at least one input from the consumer upon presentation of the customized content; and
   a product dispenser configured to dispense the tangible products;
   wherein the at least one content server transmits additional customized content for presentation on the display based at least in part on the consumer's identity and presence in proximity to the product container, and the at least one input from the consumer.

2. The system of claim 1, wherein the additional customized content identifies at least one item, and wherein the at least one item is selectable by the consumer via the input device.

3. The system of claim 2, wherein the at least one item comprises a free item, wherein said free item is receivable by the consumer after purchasing a product from the at least one product container.

4. The system of claim 3, wherein the free item is selected from the group of items consisting of a horoscope, song, fortune, email, picture, postcard, game, and reward points.

5. The system of claim 2, wherein the at least one item comprises a purchasable item, wherein said purchasable item is receivable by the consumer after inserting value into the at least one product container.

6. The system of claim 5, wherein the purchasable item is selected from the group of items consisting of tickets, music, pictures, and digital content.

7. The system of claim 1, wherein the at least one product container further comprises a printer, wherein the printer is operable to generate receipts comprising an item indicator.

8. The system of claim 1, wherein the at least one product container is operable to award the consumer with an instant prize upon the consumer making a purchase from the at least one product container.

9. The system of claim 8, wherein the instant prize awarded to the consumer is selected by the content server.

10. The system of claim 8, wherein the at least one product container further comprises a printer, wherein the printer is operable to generate a receipt comprising a reward indicator.

11. The system of claim 10, wherein the content comprises:
a web page accessible by the consumer, wherein the reward indicator may be entered by the consumer at the web page to redeem the instant prize.

12. The system of claim 1, wherein the at least one product container further comprises at least one database for storing content local to the at least one product container.

13. The system of claim 1, wherein the at least one product container is operable to display event information corresponding to an event geographically local to the at least one product container.

14. The system of claim 1, wherein the at least one sensor is selected from the group comprising: a motion sensor, a microphone, a light sensor, or a radio-frequency sensor.

15. A method for promoting a product to a consumer, comprising:
providing at least one product container capable of communicating with at least one content server and operable to dispense tangible products;
detecting a consumer's identity and presence in proximity to the product container via at least one sensor;
accessing content stored on a computer-readable medium via the at least one content server;
determining customized content selected from the content stored at the at least one content server for presentation to the consumer based at least in part on the consumer's identity and presence in proximity to the product container;
prior to a user's input to the product container, transmitting the customized content via the at least one content server to a display of the product container, wherein the customized content is based at least in part on the consumer's presence in proximity to the product container;
receiving at least one input from the consumer via an input device in communication with the product container;
accessing content stored on a computer-readable medium via the at least one content server;
determining updated customized content for presentation to the consumer based at least in part on the at least one input from the consumer; and
dispensing at least one tangible product.

16. A method for promoting a product to a consumer, comprising:
providing at least one content server capable of communicating with a product container operable to dispense tangible products;
receiving an indication of a consumer's identity and presence in proximity to the product container via at least one sensor associated with the product container;
accessing content stored on a computer-readable medium at the at least one content server;
based at least in part on the consumer's identity and presence in proximity to the product container, and prior to a user's initial input to the product container, transmitting customized content selected from the content stored at the at least one content server stored on the computer-readable medium to a display associated with the product container;
receiving an indication of at least one input from the consumer via an input device in communication with the product container;
accessing content stored on a computer-readable medium at the at least one content server;
based at least in part on detecting the consumer's identity and presence in proximity to the product container via the at least one sensor, and further based at least in part on the at least one input from the consumer, transmitting additional customized content stored on the computer-readable medium to a display associated with the product container; and
dispensing at least one tangible product.

* * * * *